United States Patent
Tang

(10) Patent No.: US 7,859,783 B2
(45) Date of Patent: *Dec. 28, 2010

(54) INCREASED FORMAT EFFICIENCY USING DISK SYNCHRONIZED WRITE

(75) Inventor: Yawshing Tang, Saratoga, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/481,297

(22) Filed: Jun. 9, 2009

(65) Prior Publication Data

US 2009/0262451 A1  Oct. 22, 2009

Related U.S. Application Data

(63) Continuation-in-part of application No. 11/973,814, filed on Oct. 9, 2007.

(51) Int. Cl.
    *G11B 5/09* (2006.01)
(52) U.S. Cl. ...................................... 360/51
(58) Field of Classification Search ............ 360/51, 360/48, 135, 66, 31, 77.08; 710/33; 428/848.5
    See application file for complete search history.

(56) References Cited

U.S. PATENT DOCUMENTS

| | | | |
|---|---|---|---|
| 6,603,622 B1 * | 8/2003 | Christiansen et al. | 360/66 |
| 6,961,203 B1 * | 11/2005 | Baker | 360/77.08 |
| 7,177,105 B1 | 2/2007 | Sutardja | |
| 7,281,065 B1 * | 10/2007 | Lam et al. | 710/33 |
| 7,446,967 B2 * | 11/2008 | Hashimoto et al. | 360/31 |
| 7,487,268 B1 * | 2/2009 | Lam et al. | 710/33 |
| 7,612,961 B2 * | 11/2009 | Yamamoto | 360/48 |
| 2006/0280975 A1 * | 12/2006 | Albrecht et al. | 428/848.5 |
| 2009/0040652 A1 * | 2/2009 | Moser et al. | 360/77.08 |
| 2009/0046385 A1 * | 2/2009 | Yamamoto | 360/2 |
| 2009/0097160 A1 * | 4/2009 | Yamamoto | 360/135 |
| 2010/0118427 A1 * | 5/2010 | Buch et al. | 360/51 |

OTHER PUBLICATIONS

Yawshing Tang et al., "Characterization of Mechanically Induced Timing Jitter in Synchronous Writing of Bit Patterned Media", IEEE Transactions on Magnetics, vol. 44, No. 11, Nov. 2008.

* cited by examiner

*Primary Examiner*—Fred Tzeng
(74) *Attorney, Agent, or Firm*—Ben J. Yorks; Irell & Manella LLP

(57) ABSTRACT

A hard disk drive with a disk that has a plurality of data fields. Each data field includes a sync field and a plurality of sync marks. Data is written onto the disk in accordance with a write clock. The write clock is generated and synchronized by the sync field and the sync marks. The sync marks are dispersed throughout the data field so that the write clock is resynchronized as data is written onto the field.

12 Claims, 5 Drawing Sheets

INCREASED FORMAT EFFICIENCY USING DISK SYNCHRONIZED WRITE

CROSS-REFERENCE TO RELATED APPLICATIONS

This application is a continuation-in-part of application Ser. No. 11/973,814 filed on Oct. 9, 2007, pending.

BACKGROUND OF THE INVENTION

1. Field of the Invention

The present invention relates to writing data onto a disk of a hard disk drive.

2. Background Information

Hard disk drives contain a plurality of magnetic heads that are coupled to rotating disks. The heads write and read information by magnetizing and sensing the magnetic fields of the disk. The disks are magnetize with a series of transitions. The transitions correspond to digital bits.

Data is stored on concentric tracks that extend radially across the surfaces of the disks. Each track typically contains a plurality of sectors. Each sector may have a number of data fields. Each data field has a sync field that is used to synchronize the reading of data within the field. For example, when reading data the sync field is used as a timing signal to create a read clock. Data is then read from the disk in accordance with the clock. The sync field is typically written with the writing of data.

It is desirable to maximize the amount of disk space that is allocated to data. The sync fields contain no data and consequently limits the data capacity of a drive It would be desirable to provide a disk drive that can accurately write data onto a disk without a conventional sync field and related spacing that exist in the prior art.

BRIEF SUMMARY OF THE INVENTION

A hard disk drive with a disk that has a plurality of data fields. Each data field includes a sync field and a plurality of sync marks. The disk drive further has a controller that causes a head to write onto the disk and synchronizes the writing of data with the sync field and the sync marks.

DETAILED DESCRIPTION

Disclosed is a hard disk drive with a disk that has a plurality of data fields. Each data field includes a sync field and a plurality of sync marks. Data is written onto the disk in accordance with a write clock. The write clock is generated and synchronized by the sync field and the sync marks. The sync marks are dispersed throughout the data field so that the write clock is re-synchronized as data is written onto the field.

Figure 1:
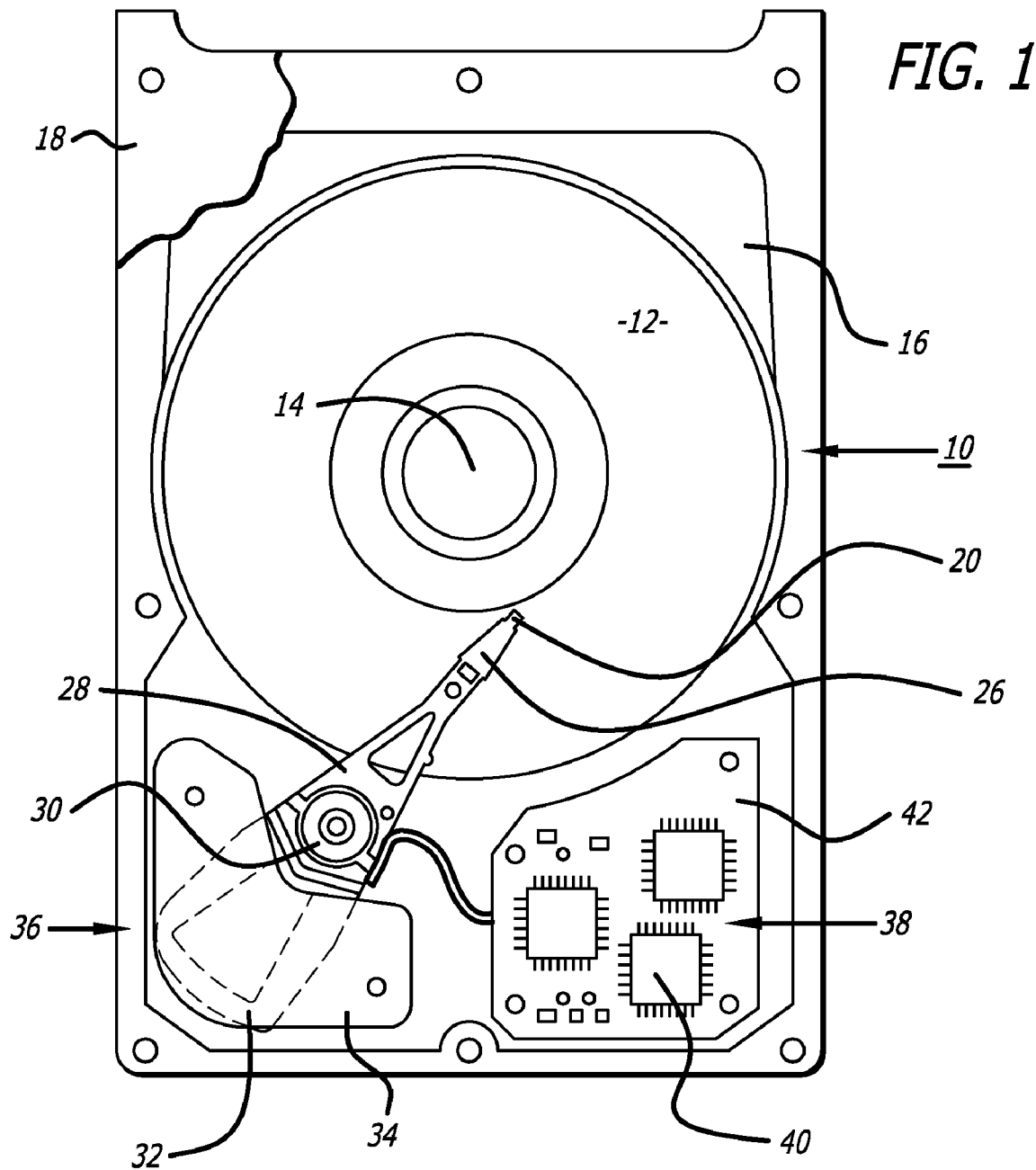
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown). The write element magnetizes the disk 12 to write data. The read element senses the magnetic fields of the disks 12 to read data. By way of example, the read element may be constructed from a magneto-resistive material that has a resistance which varies linearly with changes in magnetic flux. The write element can magnetize the disk in a vertical direction. Vertical magnetization is commonly referred to as perpendicular recording.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 2:
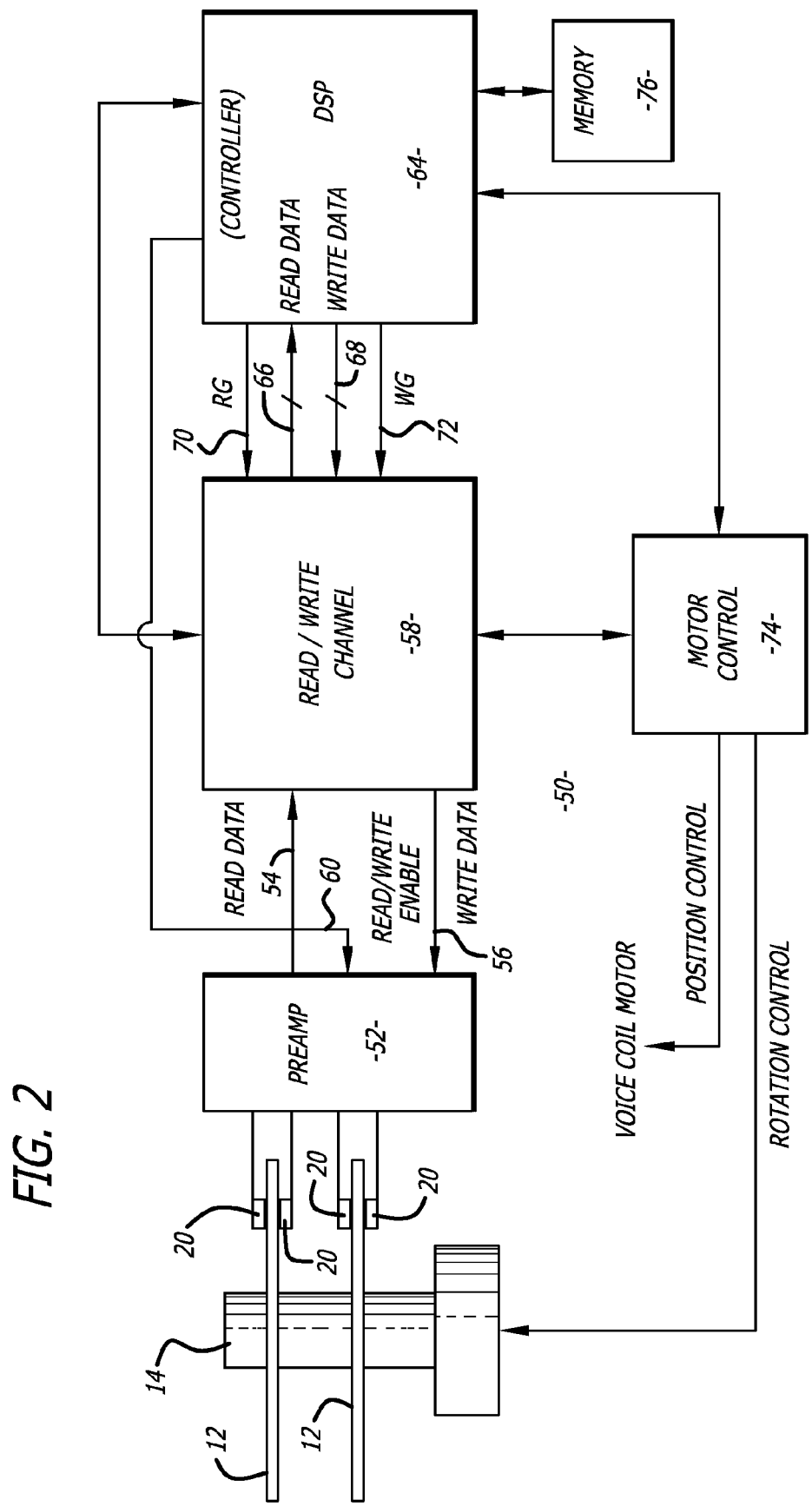
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

Figure 3:
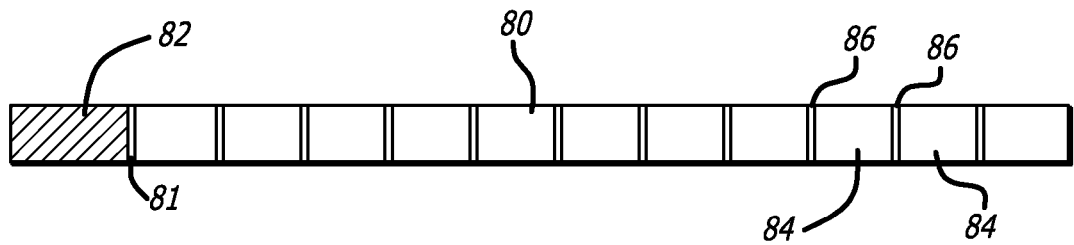
FIG. 3 is an illustration showing a data field of the patterned disk.

Data is typically stored on the disk 12 in concentric tracks. The tracks are divided into sectors. Each sector has one or more data fields. FIG. 3 shows a data field 80. The data field 80 includes a start mark 81, sync field 82 and a plurality of data segments 84 separated by sync marks 86.

Figure 4:
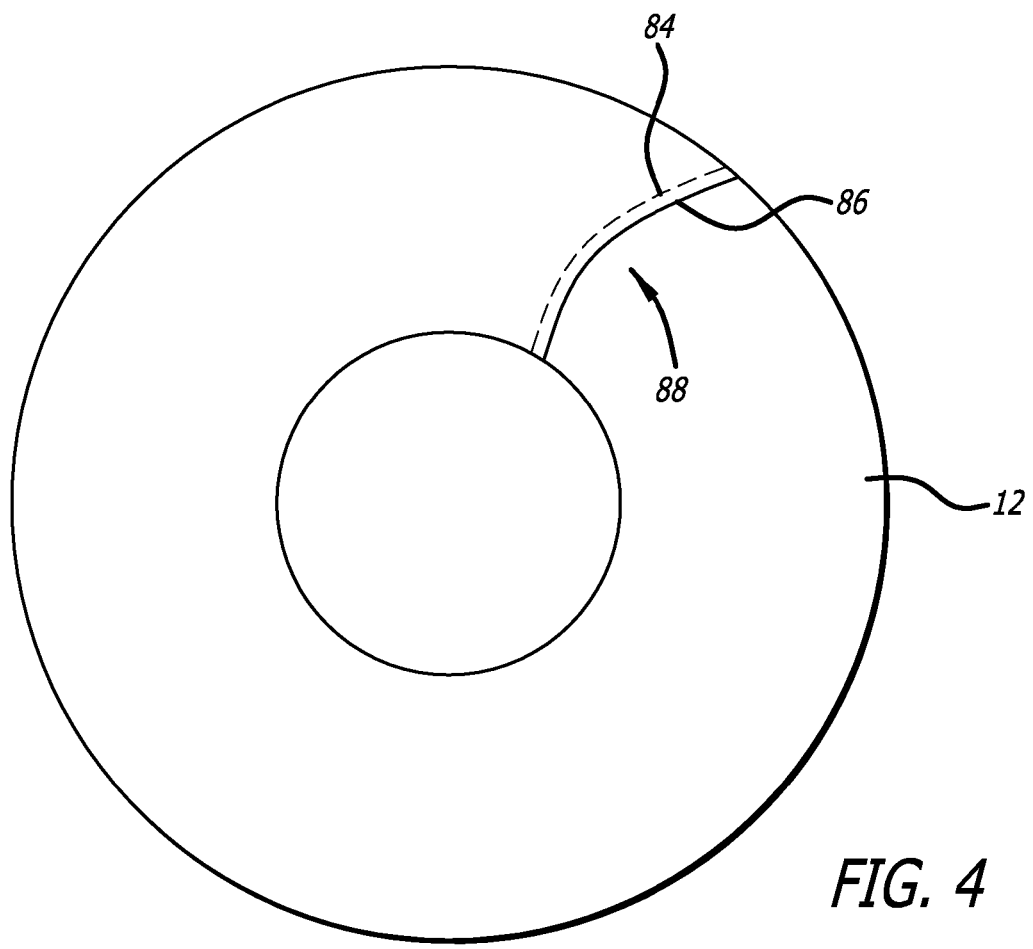
FIG. 4 is an illustration showing a radial pattern of sync marks across a disk.

As shown in FIG. 4 the sync marks 86 may be arranged in a pattern 88 that extends radially across the disk 12. The pattern 88 may have an arc shape that approximates the trajectory of the head as it moves across the disk 12. This allows the head to more readily detect the sync marks 86. Although one pattern is shown, it is to be understood that there are a multitude of such patterns across the disk 12.

Data is written onto the disk in accordance with a write clock. Referring to FIG. 3, the write clock is initially generated and synchronized by the sync field 82. The sync field 82 may have a number of magnetic transitions that generate a read signal. The read signal is synchronized by a phase locked loop. The sync mark 81 is then read to create a reference signal. A write clock is generated from the synchronized reference signal. Data is then written into the adjacent data segment 84 with the write clock. The sync marks 86 are used to regenerate and synchronize the write clock for writing data in each adjacent data segment 84. The sync marks 86 may also contain one or more transitions. Each sync mark 86 occupies less space than a full sync field 82, thus more data can be provided in a given data field.

Providing sync marks 86 periodically throughout the data field 80 resynchronizes the write clock and provides for accurate writing of data onto the magnetic dots of the disk. The small sync marks 86 minimize the amount of space taken from the data segments 84 of the field. The sync marks 86 can be evenly spaced across the data field as shown.

Figure 5:
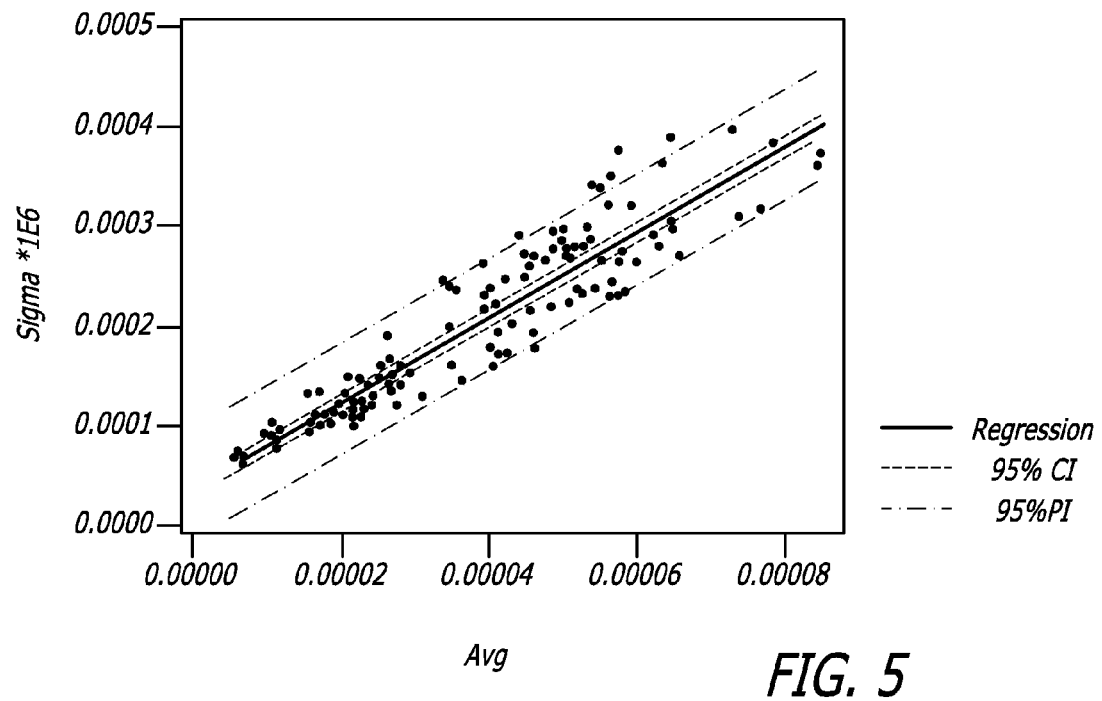
FIG. 5 is a graph showing jitter versus sync mark spacing.

FIG. 5 shows a graph of line spacing versus jitter. It is desirable to minimize jitter and the number of sync marks used in a data field. Sync marks occupy disk space and reduce the area that can be used to store data. By way of example, for optimal mark spacing, the sync marks 86 may be separated by 1000 bits, although it is to be understood that it could be greater 1000 bits. Conventionally, the data segments are in 512 byte blocks. Having additional sync marks allows the patterned disk to write in blocks other than 512 byte blocks because of re-synchronization in the write process.

Figure 6:
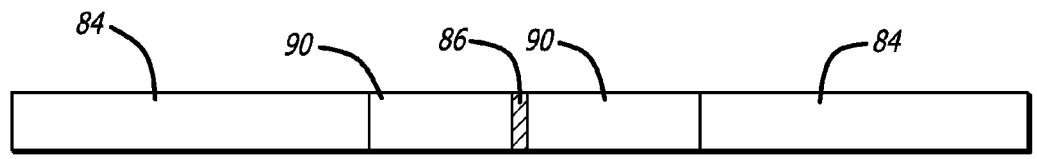
FIG. 6 is an illustration showing a sync mark in a data field.

Each head must be switched from a write mode to a read mode to read the sync marks 86. FIG. 6 shows a sync mark 86 that is separated from data segments 84 by erase bands 90. The erase bands 90 can be created by DC erasing the band areas during the creation of the sync marks 86. The erase bands 90 allow the heads to switch from write mode to read mode to read the sync mark, and then from read mode back to write mode to write data. The erase bands 90 also eliminate noise that would be present if there were data adjacent the mark 86. The erase bands 90 may not be required if the head is capable of reading while writing.

Figure 7:
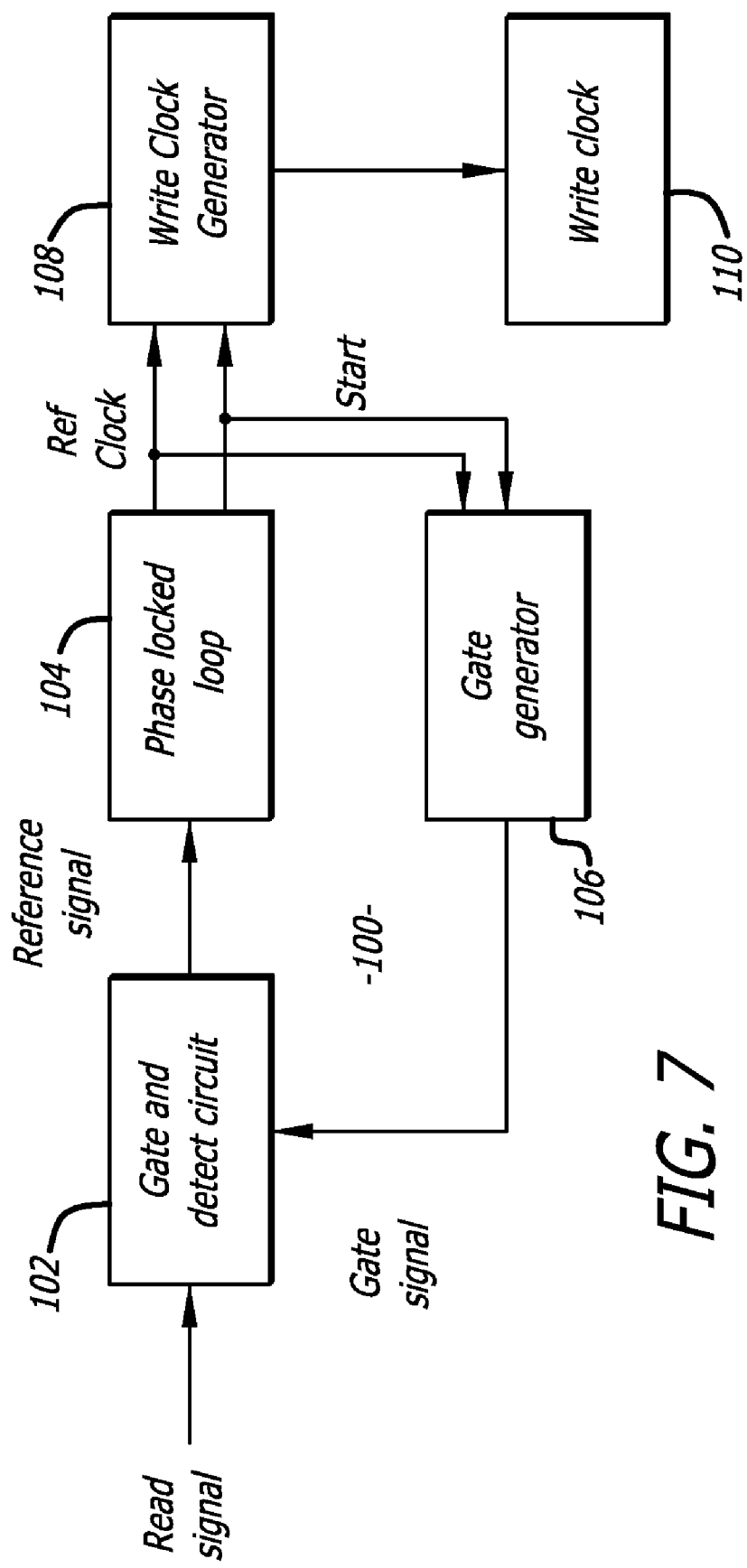
FIG. 7 is a schematic of a circuit that generates a write clock from a sync mark.

FIG. 7 shows a circuit 100 that can be used to generate a write clock from a sync mark. The circuit 100 may be part of the channel circuit 58 shown in FIG. 2. The circuit 100 includes a gate and detect circuit 102 that receives a read signal generated by a sync mark. The gate and detect circuit 102 is coupled to a phase lock loop circuit 104 and a gate generator circuit 106. The phase lock loop circuit 104 is connected to a write clock generator circuit 108.

In operation, the gate generator 106 generates a gate signal that enables the detect circuit 102, typically while the head is flying over an erase band 90 (see FIG. 7). The detect circuit 102 detects the read signal generated by the sync mark and generates a reference signal. The phase lock loop circuit 104 receives the reference signal and generates a reference clock signal or a start signal. The start signal is generated when the start sync 81 (see FIG. 4) is detected. The reference clock signals are generated from the sync marks 86 are detected. The start signal indicates the beginning of a data segment.

The write clock generator circuit 108 may vary the frequency and/or phase of the write clock. The disk may be segmented into zones, where the data rate varies in each zone. The circuit 108 may change the frequency of the write clock to account for a different data rate. The write clock is used to write data in an adjacent data segment 84.

The start and reference clock signals are provided back to the gate generator 106. The clock signals may initiate a counter within the gate generator 106. The counter may count to a value that corresponds to the occurrence of the next sync mark. This allows the gate generator 106 to time the enablement of the detection circuit 102 with the sync marks.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
    a disk that has a plurality of data fields, each data field includes a sync field and a plurality of sync marks;
    a head coupled to said disk; and,
    a controller that causes said head to write data onto said disk and synchronizes said writing of data with said sync field and said sync marks that are separate from said sync filed and have data on both sides of each said sync mark.

2. The disk drive of claim 1, wherein said sync marks are equally spaced across each data field.

3. The disk drive of claim 1, wherein said sync marks extend along radial patterns across said disk.

4. The disk drive of claim 3, wherein said radial patterns approximate a trajectory of said head across said disk.

5. The disk drive of claim 1, wherein said sync marks are separated from data by an erased band.

6. The disk drive of claim 5, further comprising a circuit that includes a gate and detect circuit that receives a read signal generated by a sync mark, a phase lock loop circuit that is coupled to said gate and detect circuit and creates a write clock, and a gate generator coupled said phase lock loop circuit and said gate and detect circuit.

7. The disk drive of claim 1, wherein said head is a perpendicular recording head.

8. A method for writing data onto a disk in a hard disk drive, comprising:
    providing a disk that has a plurality of data fields, each data field includes a sync field and a plurality of sync marks that are separate from said sync filed and have data on both sides of each said sync mark;
    generating at least one write clock using the sync field and sync marks; and,
    writing data onto one of the data fields in accordance with the write clock.

9. The method of claim 8, wherein the write clock is synchronized by each sync mark.

10. The method of claim 9, further comprising detecting a read signal generated by a sync mark and phase locking the read signal to create the write clock.

11. The method of claim 8, further comprising varying the frequency and/or phase of the write clock.

12. The method of claim 11, wherein the read signal is detected in accordance with a gate that is set after a count interval.

* * * * *